(12) United States Patent
Mir

(10) Patent No.: US 8,622,663 B1
(45) Date of Patent: Jan. 7, 2014

(54) DRILL BIT FOR DRILLING HOLES IN CARBORESIN LAMINATES

(76) Inventor: Afzaal Mir, Greenville, SC (US)

(*) Notice: Subject to any disclaimer, the term of this patent is extended or adjusted under 35 U.S.C. 154(b) by 0 days.

(21) Appl. No.: 13/291,833

(22) Filed: Nov. 8, 2011

Related U.S. Application Data

(62) Division of application No. 12/341,455, filed on Dec. 22, 2008, now Pat. No. 8,052,361.

(51) Int. Cl.
*B23B 51/02* (2006.01)

(52) U.S. Cl.
USPC .......................................... 408/1 R; 408/230

(58) Field of Classification Search
USPC .................................. 408/1 R, 227, 229, 230
IPC ........................................................ B23B 51/02
See application file for complete search history.

(56) References Cited

U.S. PATENT DOCUMENTS

| | | | |
|---|---|---|---|
| 62,216 A | 2/1867 | Ollom | |
| 1,320,985 A | 11/1919 | Brightman | |
| 2,258,674 A | 10/1941 | Ceska | |
| 2,887,136 A | 5/1959 | Rathgeber | |
| 3,443,459 A | 5/1969 | Alexander | |
| 3,645,642 A | 2/1972 | Koslow | |
| 3,977,807 A | 8/1976 | Siddall | |
| 4,440,532 A | 4/1984 | D'Apuzzo | |
| 4,671,710 A | 6/1987 | Araki | |
| 4,898,503 A | 2/1990 | Barish | |
| 5,000,630 A | 3/1991 | Riley et al. | |
| 6,676,342 B2 | 1/2004 | Mast et al. | |
| 6,929,434 B2 | 8/2005 | Prokop | |
| 7,223,053 B2 | 5/2007 | Flynn | |
| 7,367,758 B2 | 5/2008 | Turrini et al. | |
| 7,575,401 B1 | 8/2009 | Garrick et al. | |
| 7,665,935 B1 | 2/2010 | Garrick et al. | |
| 2010/0158626 A1 | 6/2010 | Nakahata et al. | |
| 2010/0166517 A1 | 7/2010 | Saito et al. | |

*Primary Examiner* — Eric A Gates
(74) *Attorney, Agent, or Firm* — John B. Hardway, III; Nexsen Pruet, LLC

(57) ABSTRACT

A drill bit having features rendering it particularly effective in cutting holes in carboresin laminates of the type used in the aircraft industry. A pair of diametrically opposite lands slope radially inward at the working end of the bit to a pair of cutting edges disposed at an obtuse angle to one another and forming an efficient cutting tip. Notches with sloping ramps adjacent the cutting edges efficiently convey cut material to adjacent flutes. The lands curve radially inward between their full diameter portion and their cutting tips and the junction of the curved portion and the constant diameter portion of the lands is machined to provide a more gradual transition.

3 Claims, 5 Drawing Sheets

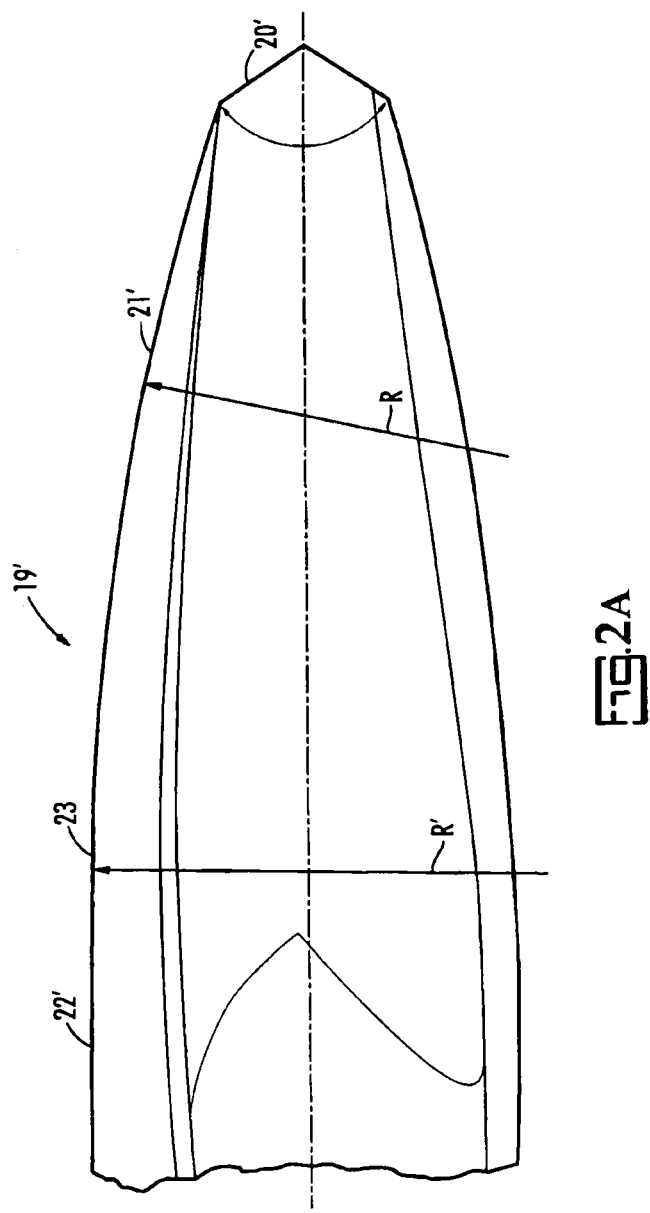

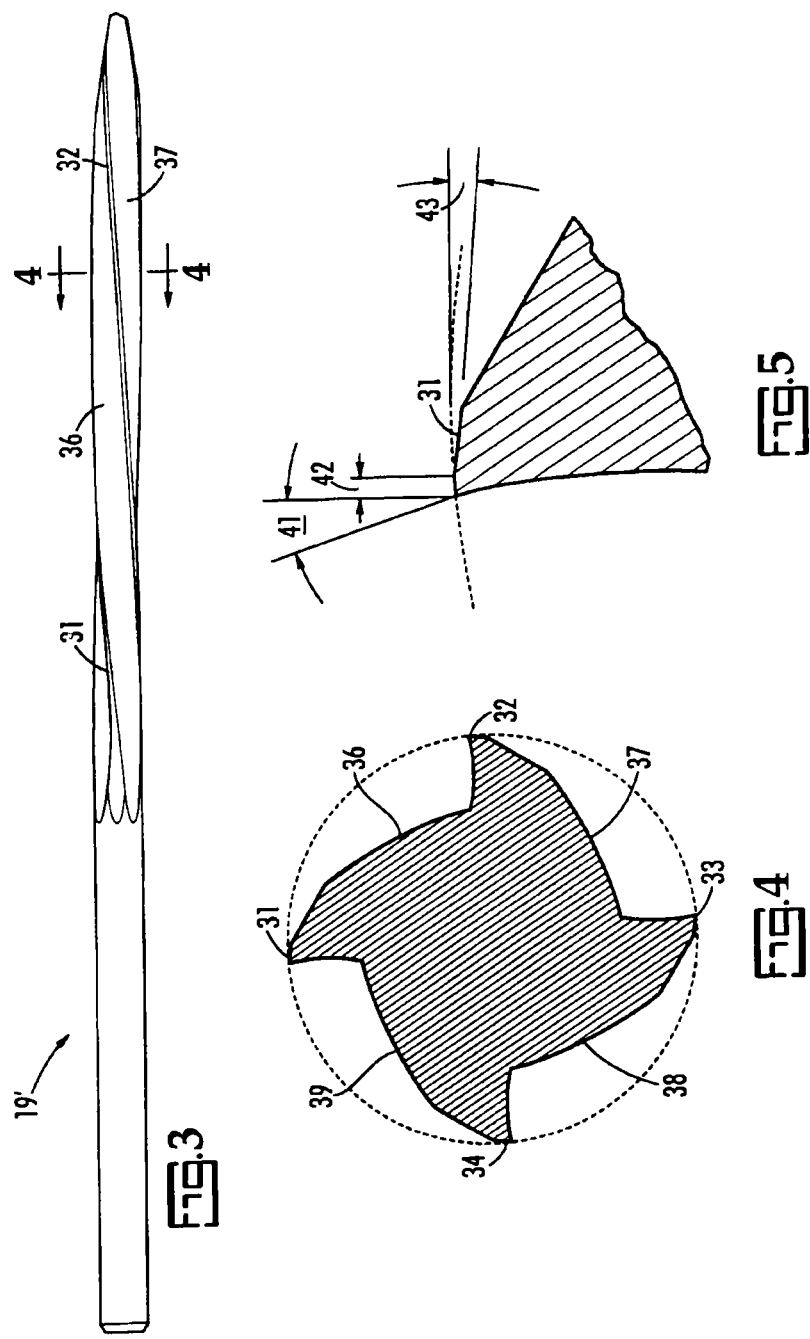

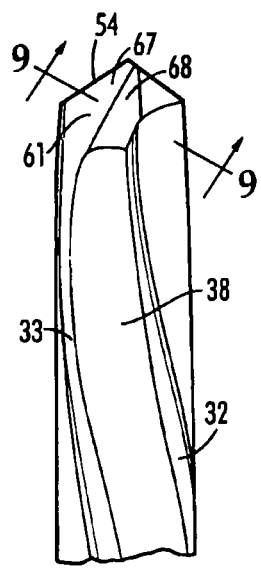 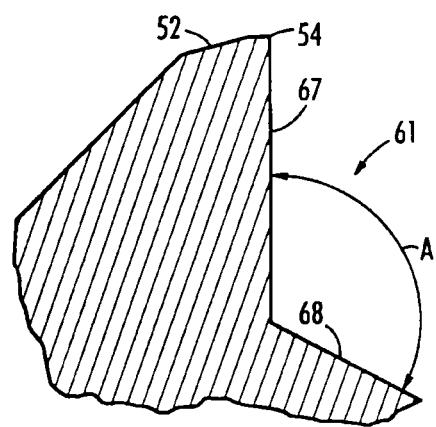 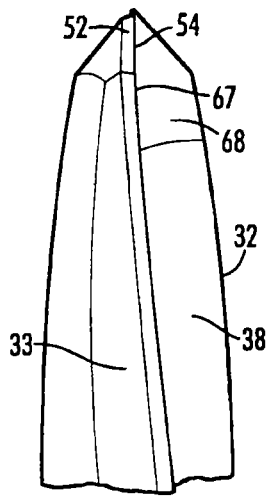

DRILL BIT FOR DRILLING HOLES IN CARBORESIN LAMINATES

This application is a divisional application of U.S. patent application Ser. No. 12/341,455 filed Dec. 22, 2008 which issued on Nov. 8, 2011 as U.S. Pat. No. 8,052,361.

BACKGROUND OF THE INVENTION

This invention relates to drilling holes in composite materials such as carboresin laminates and particularly laminates having a resin reinforced with carbon fibers of graphic structure and laminates called carboresins formed by graphite fibers embedded in a matrix of epoxy resin. Materials of the beforementioned type are widely used in the aircraft industry to drill clean holes without de-lamination. Such a drill is used to form a multitude of relatively small diameter holes in building aircraft and heretofore drills used for forming holes in laminate used in that industry have short effective working life. Thus there is not only a need for a drill capable of rapidly forming clean small diameter holes in carboresins and the like materials, but also a need for such a drill which has a long effective working life.

SUMMARY OF THE INVENTION

The illustrated drill using this invention has four helical flutes and four lands having a left hand helix between 5 and 9 degrees. The herein illustrated drill is a 12 centimeter diameter drill with flutes and lands extending 90 centimeters from the cutting tip of the drill to its shank. In the illustrated embodiment of the invention, a pair of diametrically opposite lands terminate at the 120 degree tip of the drill in a pair of cutting edges extending radially outward in opposite directions from near the center of the drill in substantially parallel axial planes. The cutting edges slope rearwardly and radially outward from the tip of the drill to diametrically opposite lands at an angle of approximately 60 degrees to the drill axis thereby providing a 120 degree point or tip angle. Axial movement of cut material from the cutting edges is facilitated by a pair of passageways or notches formed by flat axially extending surfaces which slope extending axially rearwardly from the cutting edges of the drill and substantially flat slope surfaces at an obtuse angle of 120° angles to the, respective, axially extending surfaces. The slope surfaces extend axially rearwardly from the tip at 40° angles, respectively, to a plane through the drill axis at right angle to the parallel cutting edges. The slope surfaces junction with diametrical opposite flutes, respectively. At the cutting end of the drill, the lands slope to the cutting edges of the tip in a reduced diameter fashion at a slope radius as great as 20 inches. The junction area of the sloping segments with the non sloping segments of the lands results in a somewhat uneven radially outward facing contour. The uneven contour is smoothly contoured by surface machining the junction area at a greater radius than the slope radius. The hereinafter described construction of the working end of the drill results in a drill which cuts clean holes in carboresin laminates and with minimal wear of the drill. The cutting capability of the drill together with its superior ability to efficiently move the cut material axially, greatly reduces the time required for forming the holes. The improved cutting action and the efficient movement of cut material reduces the heat generation of the drilling operation and results in greatly increased the working life of the drill. Users of the drill have reported drill life of 5 or more times that achieved with other drills sold for use in forming holes in the same carboresin material.

BRIEF DESCRIPTION OF THE DRAWINGS

One embodiment of the invention is illustrated in the drawings, in which:

FIG. 2A is an enlarged side view of the cutting end of the drill bit;

FIG. 3 is a side view of a drill bit of the present invention;

FIG. 4 is a section taken on the line 4-4 in FIG. 3;

FIG. 5 is an enlarged cross section view of a land of the drill bit of the present invention;

FIG. 8 is a side view of the working end of the bit of this invention;

FIG. 9 is a section taken on line 9-9 in FIG. 8, and

FIG. 10 is a side view of the tip of the working end of the bit of this invention rotated 90° relative to its position shown in FIG. 8.

DETAILED DESCRIPTION OF THE INVENTION

Figure 1:
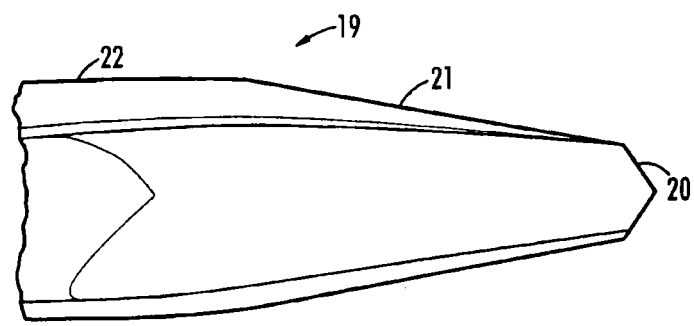
FIG. 1 is a side view of the cutting end of a prior art drill bit.
Figure 2:
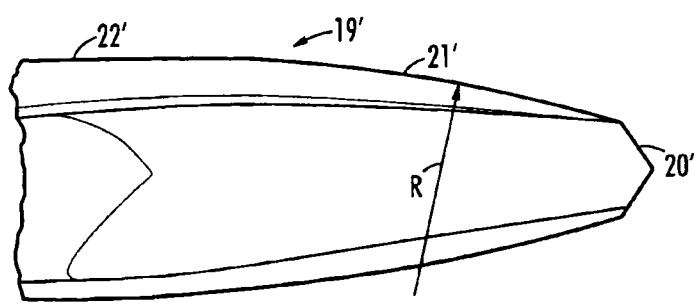
FIG. 2 is a side view of the cutting end of the drill bit of the present invention.

FIG. 1 illustrates a prior art drill 19 having a conventional tip 20 and a straight line taper 21 from the uniform diameter body portion 22 of the drill 19 to the 120 degree tip 20. FIG. 2 illustrates the working end of the drill 19' of the present invention wherein the transition on taper or transition portion 21' from its uniform body diameter portion 22' to its 120 degree tip 20' is curved radially on a radius R, which accelerates enlargement of the hole being drilled. The before mentioned feature of this invention is further illustrated in FIG. 2A wherein the transition area 23 between the tip and the uniform or constant body diameter portion 22' is further modified by machining the outer diameter of the drill at the junction area between the constant diameter portion 19 and the transition portion 21' at a radius R' to remove material 23 to make the rate of increase in the diameter of cut more gradual, thereby more evenly distributing the cutting generated heat at the junction area with a resulting increase in working life of the drill.

Figure 6:
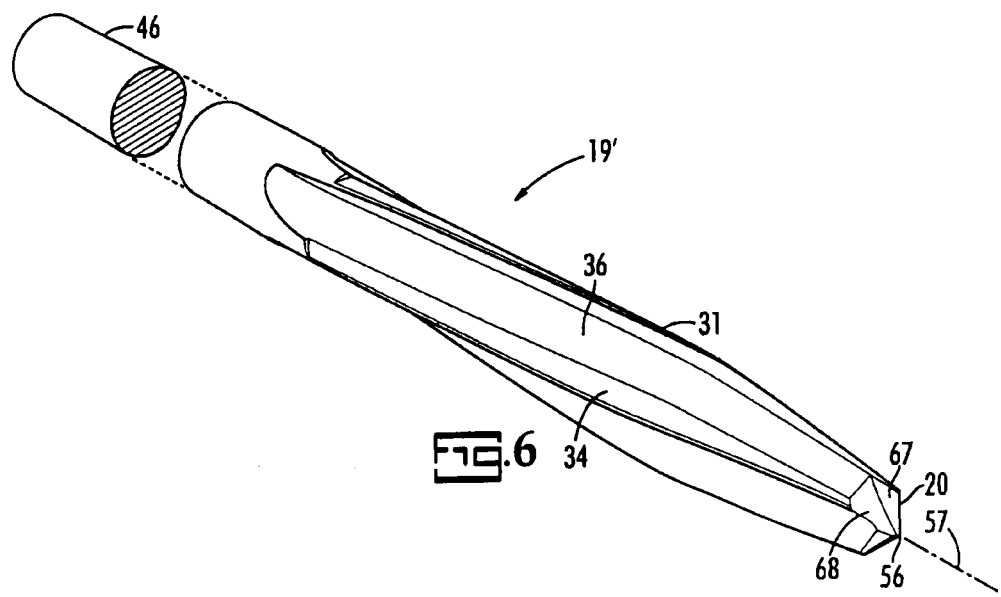
FIG. 6 is a perspective of a drill bit of the present invention.
Figure 7:
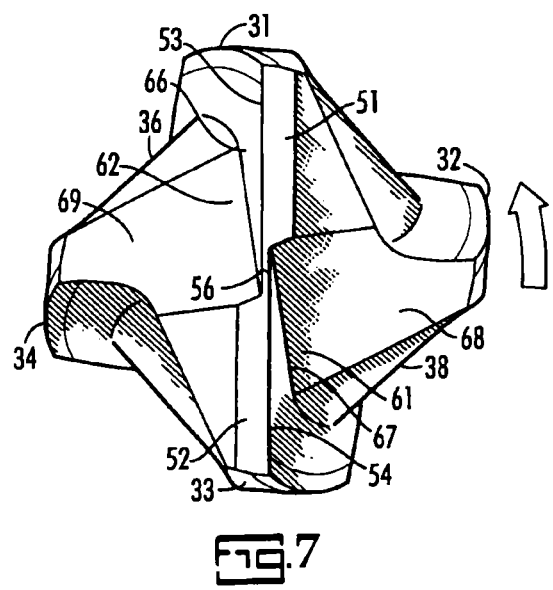
FIG. 7 is an end view of the bit shown in FIG. 6.

FIGS. 3 and 4 show the four lands 31, 32, 33, 34 and the four flutes 36, 37, 38, 39 of the drill 19'. The lands have a 5 degree helix angle. FIG. 5 shows land 31 and its radial rake angle 41, its margin 42 and its margin relief angle 43. FIGS. 6 and 7 shows a ½ inch diameter drill 19' of the present invention, which has a 3 inch long shank 46 and lands 31, 32, 33 and 34 extending axially 3 inches from the shank 46 to the unique cutting tip 20'. Lands 31 and 33 of the drill taper radially inward toward the cutting end of the drill 19' and terminate in a pair of cutting blades 51, 52 presenting cutting edges 53, 54 lying in parallel axially extending planes. The cutting edges 53, 54 are interconnected by a very short transverse chisel edge 56 intersecting the drill axis 57. Material cut by the cutting edges 53, 54 is transferred to flutes 36, 38 by notches 62, 61 formed between the cutting edges 53, 54 and the flutes 36, 38 respectively.

Referring also to FIGS. 6 through 10, the notch 61 is formed by a flat face 67 extending axially rearwardly from the cutting edge 54 and a flat ramp 68 extending from the flat face 67 at an obtuse angle of 120 degrees and sloping axially from near the bit tip 56 of the flute 38 at a 45° angle. Notch 62 is formed in a similar manner by flat face 66 and inclined flat ramp 69 thereby providing a large passageward for movement of material cut by the cutting edge 53 to the flute 36. Formation of the notches 61, 62 with their flat ramps 68, 69 removes part of the forward ends of the lands 32, 34 and thus the lands 32, 34 do not help in initiating the formation of a drilled hole but do assist in enlarging the opening formed by cutting edges 53, 54 to the hole size created by full insertion of the drill 19' in the hole being formed.

The herein disclosed drill has proven to be an efficient durable tool for forming holes in carboresin materials used in the manufacture of aircraft. The working life of this tool greatly exceeds that of drills marketed by other manufactures. The improved cutting action of the tip, the efficient transfer of cut material to the flutes and the improved cutting action of transition portion of the lands to the constant diameter portion of the drill contribute to more efficient cutting and conveying of cut material which results in reduced drill temperature and greatly increased drill life.

What is claimed is:

1. A method for drilling a hole in a carboresin laminate comprising:
    providing a drill bit having,
        a shank,
        a body and a cutting tip adapted for rotation about its axis to drill holes in a carboresin material,
        a plurality of helical flutes in said body separated by helical lands defining the cutting diameter of said bit, each land having a lip presenting a helical cutting edge, at least two of said lands terminating in a cutting tip having an obtuse point angle,
        notches formed between said at least two lands by axially and radially extending flat faces and inclined ramps which extend rearwardly from said tip at an obtuse angle to said flat faces, respectively, said notches serving to convey material cut by said cutting tip to said helical flutes,
        said at least two lands having transition portions curving radially inward from said drill diameter to said cutting tip at a predetermined radius between 5 and 20 inches and wherein the junction of said lands with their respective transition portions are chamfered at a radius greater than said pre-determined radius; and
    contacting said carboresin laminate with said drill bit; and
    turning said drill bit to form said hole in said carboresin laminate.

2. The method for drilling a hole in a carboresin laminate of claim 1 wherein said inclined ramps are flat surfaces.

3. The method for drilling a hole in a carboresin laminate of claim 1 wherein said drill bit includes four lands and four flutes, said lands being equally spaced circumferentially and said cutting blades being formed on the tip ends of diametrically opposite lands.

* * * * *